(12) United States Patent
Driesen et al.

(10) Patent No.: US 9,720,994 B2
(45) Date of Patent: Aug. 1, 2017

(54) REPLICATED DATABASE STRUCTURAL CHANGE MANAGEMENT

(71) Applicants: Volker Driesen, Walldorf (DE); Peter Eberlein, Malsch (DE)

(72) Inventors: Volker Driesen, Walldorf (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 844 days.

(21) Appl. No.: 13/644,273

(22) Filed: Oct. 4, 2012

(65) Prior Publication Data

US 2014/0101099 A1 Apr. 10, 2014

(51) Int. Cl.
G06F 7/00 (2006.01)
G06F 17/30 (2006.01)

(52) U.S. Cl.
CPC .............. G06F 17/30578 (2013.01)

(58) Field of Classification Search
None
See application file for complete search history.

(56) References Cited

U.S. PATENT DOCUMENTS

| | | | |
|---|---|---|---|
| 5,333,316 A * | 7/1994 | Champagne | G06F 17/50 707/999.008 |
| 7,447,786 B2 * | 11/2008 | Loaiza | G06F 9/526 709/229 |
| 8,489,773 B1 * | 7/2013 | Binshtock | H04L 67/1095 707/609 |
| 8,667,028 B2 * | 3/2014 | Franz | 707/803 |
| 2003/0126162 A1 * | 7/2003 | Yohe | G06F 17/30575 |
| 2004/0030739 A1 * | 2/2004 | Yousefi'zadeh | G06F 17/30545 709/201 |
| 2005/0055445 A1 * | 3/2005 | Gupta | G06F 11/2074 709/226 |
| 2006/0010170 A1 * | 1/2006 | Lashley | G06F 12/0813 |
| 2006/0195666 A1 * | 8/2006 | Maruyama | G06F 3/0613 711/162 |
| 2006/0211404 A1 * | 9/2006 | Cromp | G06Q 10/06 455/405 |
| 2008/0034015 A1 * | 2/2008 | Behnen et al. | 707/204 |
| 2008/0288811 A1 * | 11/2008 | Sudhakar | G06F 17/30067 714/4.11 |
| 2009/0063486 A1 * | 3/2009 | Oza | G06F 9/526 |
| 2009/0292745 A1 * | 11/2009 | Bose et al. | 707/204 |
| 2010/0005124 A1 * | 1/2010 | Wagner | 707/202 |
| 2012/0109906 A1 * | 5/2012 | Wagner | 707/690 |

* cited by examiner

Primary Examiner — Hasanul Mobin
(74) Attorney, Agent, or Firm — Schwegman Lundberg & Woessner, P.A.

(57) ABSTRACT

The various embodiments herein include at least one of systems, methods, and software that operate to replicate structural changes made to a master database to a replicate database. In some such embodiments, changes made to a master database are identified and a representation thereof is provided to a process that implements such changes in the replicate database. The structural changes are then replicated in the replicate database.

20 Claims, 6 Drawing Sheets

REPLICATED DATABASE STRUCTURAL CHANGE MANAGEMENT

BACKGROUND INFORMATION

Databases are commonly used to store data that underlies enterprise software systems. Through use of the software systems, users and automated processes access data stored in the database. As the number of users and automated processes grows, databases can become overwhelmed by the number of data requests and latency increases. To combat this latency, all or select portions of data stored in the database can be replicated to another database. The addition of a replicate database also typically includes the addition of a process that handles replication of data from a master database to the replicate database. While such master and replicate databases along with a data replication process can resolve database latency issues, other issues are introduced. One such issue arises when the master database is structurally changed, the replicate database may not be able to receive updates from the data replication process due to structural data storage mismatches. Resolving such issues to date have required manual modifications to both the master database and replicate database as well as changes to underlying data views, the data replication process, and other elements. As with many manual data processing tasks, these tasks are time consuming, expensive, and are prone to error.

BRIEF DESCRIPTION OP THE DRAWINGS

DETAILED DESCRIPTION

The various embodiments illustrated and described herein include at least one of systems, methods, and software that operate to replicate structural changes made to a master database to a replicate, database. Some such embodiments include a Structure Change Adoption Engine (SCAE), which may take one of several possible forms when deployed. The SCAE may perform one or more functions, which may include identification of structural changes to a master database, generating a data representation of master database structural changes, transporting the generated data representation to a replicate database, and replicating the structural changes on the replicate database. These and other embodiments are illustrated and described herein with reference to the drawings.

In the following detailed description, reference is made to the accompanying drawings that form a part hereof and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
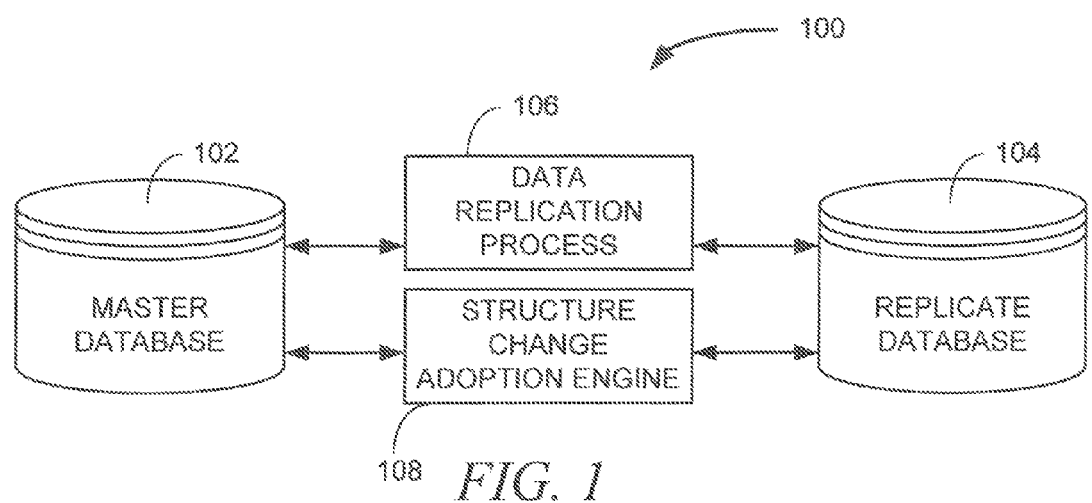
FIG. 1 is a logical illustration of a system, according to an example embodiment.

FIG. 1 is a logical illustration of a system 100, according to an example embodiment. The system includes a master database 102 and a replicate database 104. Between the master database 102 and the replicate database 104 are processes that operate to replicate data and to replicate structural changes. These processes are illustrated within the system 100 as a data replication process 106 and Structure Change Adoption Engine (SCAB) 108. While the data replication process 106 and SCAB 108 are illustrated in system 100 as operating between the master database 102 and the replicate database 104, this is a logical illustration to provide a simplistic view of the system 100 rather than providing an implicit requirement that these processes be located as such. In other embodiments, such as is illustrated in and will be described with regard to FIG. 2, the data replication process 106 and the SCAE 108 may be located differently and portions of these processes may even be bifurcated. Thus, although the illustration of the system 100 provides an example embodiment, it should not be construed in any manner as a limiting other possible arrangements of the data replication process 106 and the SCAE 108.

The master database 102 is an example of a database that stores data underlying a software system, such as an Enterprise Resource Planning (ERP) system, a Customer Relationship Management (CRM) system, an accounting system, or other software system that includes a database storing data consumed and generated by the software system. Thus, as should be readily apparent to one of skill in the art, although a single master database 102 is illustrated, the master database 102 may in some embodiments be multiple databases that together form the master database 102.

The replicate database 104 is a database to which data from the master database 102 is replicated. The replicate database 104, in various embodiments, may include all or a portion of the data stored in the master database 102. For example, certain data that, is frequently accessed may be replicated to the replicate database 104 to reduce the frequency at which the replicated data is accessed from the master database 102. In such embodiments, one or more software applications and processes that access the data stored in the master database 102 may be modified to instead access data replicated to the replicate database at certain times, such as for presenting data that is to be read and not updated.

In some embodiments, the replicate database 104 may be an in-memory database that stores all, or at least some, data in last access memory, such as random access memory or solid-state drives. Such embodiments may be implemented to provide rapid data access for analytic and reporting processes to speed generation of reports and analytics information based on the replicated data.

Regardless of the reasons for utilizing a replicate database 104 in a particular embodiment, the replicate database 104 stores data that is replicated from the master database 102. When data is updated in the master database 102, the data replication, process 106 operates to identify the updated data, such as data that has been subject to create, read, update, and delete (CRUD) actions. The data replication process 106 then gathers the modified data and transports a representation thereof to the replicate database 104, which is then updated. However, in embodiments where less than all data of the master database 102 is replicated to the replicate database 104, the data replication process 106 monitors and gathers only data that is to be replicated to the replicate database 104. The data replicated to the replicate database 104 may be designated in various ways in different embodiments, such as by configuration settings. Further, the data to be replicated may be raw table data that is replicated in an identical form from a table in the master database 102 to an identical table in the replicate database 104. However, data may be replicated in alternate forms. For example, data within, a master database 102 table may include values that are representative of data, stored in another table. When replicating such data, a single table or view may be replicated to the replicate database that combines data from the two tables. Additionally, other forms of data may be replicated, such as data output by a stored procedure of the master database 102, report data, period end data (monthend, quarter-end, year-end, etc.), and other such data.

The data to be replicated from, the master database 102 to the replicate database has certain properties. Such properties may include field length, data type, and even its mere existence as tables and columns may be added and removed. The properties may also include output of stored procedures, views, data mappings, data transformations, primary key/foreign key relations, and the like. Such properties are referred, to herein as structure. Changes to the structure are therefore referred to as structural changes. Accordingly, the SCAE 108 operates to replicate structural changes made to the master database 102 to the replicate database 104 as needed in view of the designations of the data to be replicated.

Structural changes to the master database 102 may be identified by the SCAE 108 in various ways in different embodiments. For example, when a structural change is made to the master database 102, a record of the change may be written to a log and the SCAE 108 may read the log to identify the structural changes. In other embodiments, a process that implements structural changes in the master database 102 may provide data representative of the structural changes to the SCAE 108. In further embodiments, the SCAE 108 may perform a structure comparison between the master database 102 and the replicate database 104 to derive what structural changes have been made. Other embodiments may include other or additional functionality to identity, or otherwise derive, structural changes to the master database 102.

Figure 2:
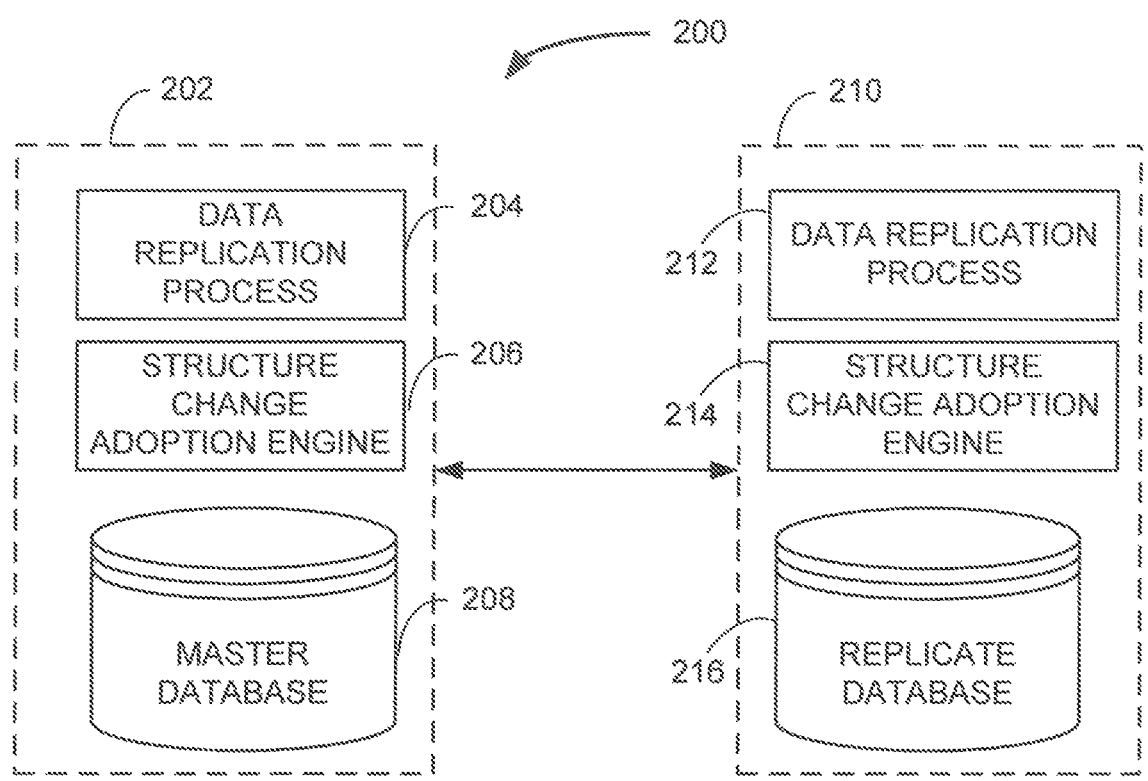
FIG. 2 is a logical illustration of a system, according to an example embodiment.

FIG. 2 is a logical illustration of a system 200, according to an example embodiment. The system 200 is similar to the system 100 of FIG. 1, but the data replication functionality is split into two data replication processes 204, 212 and the structural change replication functionality is split into two SCAEs 206, 214. The split data replication processes 204, 212 and the split SCAEs 206, 214 divide the functionality performed by the data replication process 106 and SCAE 108 of FIG. 1. In such an embodiment, the master database 208 side of the data replication and structural change replication is performed by the data replication process 204 and SCAE 206, respectively. Likewise, the replicate database 216 side of the data replication and structural change replication is performed by the data replication process 212 and SCAE 214, respectively. Thus, the differences between the system 100 of FIG. 1 and the system 200 are not necessarily in functionality, but rather where different portions of the functionality are performed.

More specifically, the system 200 includes a first computing environment 202 and a second computing environment 210. The first computing environment 202 may be one or more servers upon which a database management system (DBMS) of a master database 208 is present. The first computing environment 202 as illustrated also includes the data replication process 204 and the SCAE 206, which execute on a server computer to perform their functions. Similarly, the second computing environment 210 may be one or more servers upon which a database management system (DBMS) of a replicate database 216 is present. The second computing environment 210 as illustrated also includes the data replication process 212 and the SCAE 214, which execute on a server computer to perform their functions.

The first and second computing environments 202, 210 may be co-located in the same facility, but need not be. In some embodiments, the first and second computing environments 202, 210 may be different virtual machine environment present on the same hardware. In further embodiments, the first and second computing environments 202, 210 may be geographically dispersed. Regardless, the first and second computing environments 202, 210 are interconnected via at least one communication channel, such as a data network. The data network may include one or more of a local area network, a system area, network, the Internet, and other network types.

Figure 3:
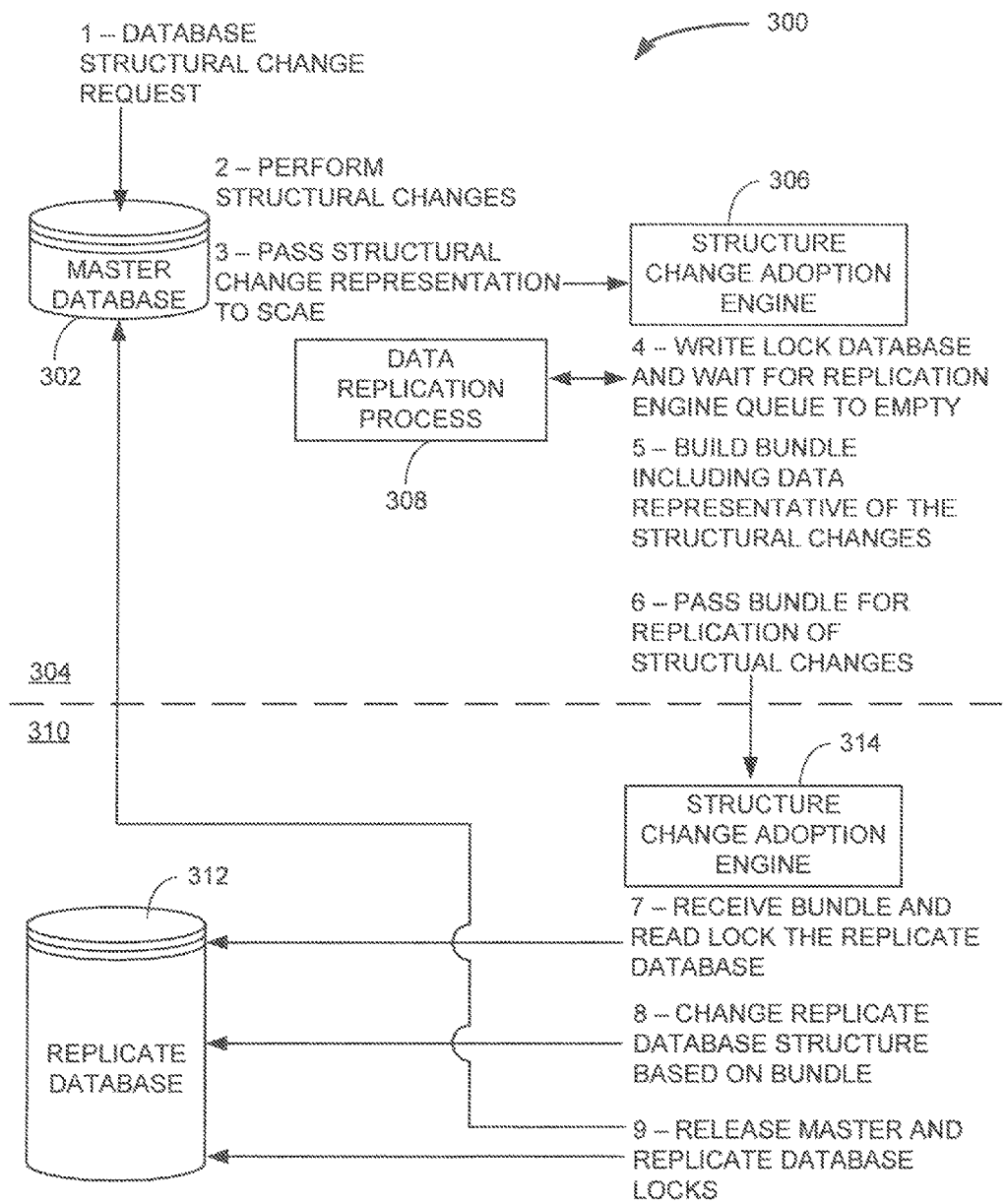
FIG. 3 is a logical illustration of a method with reference to a system, according to an example embodiment.

FIG. 3 is a logical illustration of a method with reference to a system 300, according to an example embodiment. The system 300 includes a master database 302 portion 304 and a replicate database 312 portion 310. Both portions 304, 310 include an SCAE 306, 314 and the master database 302 portion 304 includes a data replication process 308. The replicate database 312 portion 310 may also include a data replication process, but it is not illustrated within the system 300 or referenced by the example method illustrated in FIG. 3.

The method illustrated in FIG. 3 with reference to system 300 is an example of a method that may be performed to replicate master database 302 structural changes to the replicate database 312. The method begins at 1 with a database structural change request be received with regard to the master database 302. The structural changes may then be performed at 2. A process utilized to make the structural changes to the master database 302, such as a DBMS utility, may then at 3 pass a structural change representation to the SCAE 306. However, in some embodiments, the SCAE 306 may instead obtain or determine data representative of the structural changes to the master database 302.

Next, the SCAE 306 at 4 locks the master database 302 to prevent further structural and data changes. The lock may be a full lock of the database, but in some embodiments, the lock may just be a write lock. However, depending on the particular DBMS of the master database 302, the lock-type may vary in different embodiments. The SCAE 306, after locking the master database 302, waits for the data replication process 308 to complete replication of pending data replication actions. The SCAE 306 at 5 then builds a change bundle including data representative of the structural changes to the master database 302. The change bundle may include data in different forms, depending on the particular embodiment, such as the type of DBMS of each of the master database 302 and replicate database 312. For example, the change bundle may include Data Definition Language (DDL) statements, such as Structured Query Language (SQL) statements, issued against the master data base 302 to implement the structural changes which can then be issued against the replicate database in the same or a translated manner. In other embodiments, the data representative of the structural changes to the master database 302 may be represented in a metadata format that is consumable by the SCAE 314 to implement the structural changes in the replicate database 312. Regardless of the format of the data representative of the structural changes to the master database 302 within the change bundle, the change bundle is then passed at 6 by the master database 302 portion 304 SCAE 306 to the replicate database 312 portion 310 SCAE 314.

The replicate database 312 portion 310 SCAE 314 at 7 receives the change bundle including data representative of the structural changes to the master database 302 that are to be replicated to the replicate database 312. Also at 7, the SCAE 314 locks the replicate database 312. The lock of the replicate database 312 may be a full lock of the replicate database 312, however in some embodiments the replicate database 312 may be a read-only database and therefore, only a read-lock may be made in some such embodiments. The SCAB 314 at 8 then structurally changes the replicate database 312 based on the change bundle.

In some embodiments, the SCAE 314 upon receiving the change bundle at 7 and prior to the locking the replicate database 312, the SCAE 314 first performs a check with regard to the data representative of the structural database changes included in the change bundle to see if the changes have already been implemented. Such changes represented in the change bundle may have already been received such as in instances where the structural master database 302 and replicate database 312 changes were updated as part of a system 300 upgrade, and the like. When the SCAE 314 determines one, a plurality of, or all of the structural changes have already been implemented in the replicate database 312, the already implemented changes are ignored. If all of the changes represented in the change bundle have been implemented, the SCAE 314 will release any locks that already have been, placed on either the master database 302 or replicate database 312 and the SCAE 314 will complete execution.

In some embodiments, data from the received change bundle is also utilized by the SCAB 314 to update user interface definitions impacted by the structural database changes. For example, when the changes include an addition, or removal of a data field, such as column in a database table, or a change in data-type or field length, the SCAE 314 may update one or more user interface definitions within which an affected field is present. Such user interface definitions changes may be made in instances where an application that accesses data within the replicate database are dynamically generated based on metadata descriptive of the data to be presented. Such user interfaces may be presented in webpages, device apps, or other applications that generate user interface views based on metadata or markup language data. In some instances, such user interface definition changes may be made by simply modifying metadata within the replicate database 312 descriptive of the replicate database 312 itself and the tables and columns therein. In other embodiments, the user interface definition changes may be made by updating data stored in replicate database 312, updating data stored elsewhere, updating data stored in one or more files from which user interlace views are generated, or other data.

Upon completion of the structural changes, the SCAE 314 at 9 releases the master database 302 and the replicate database 312 locks. At this point, the system 300 has been structurally updated by the method.

Figure 4:
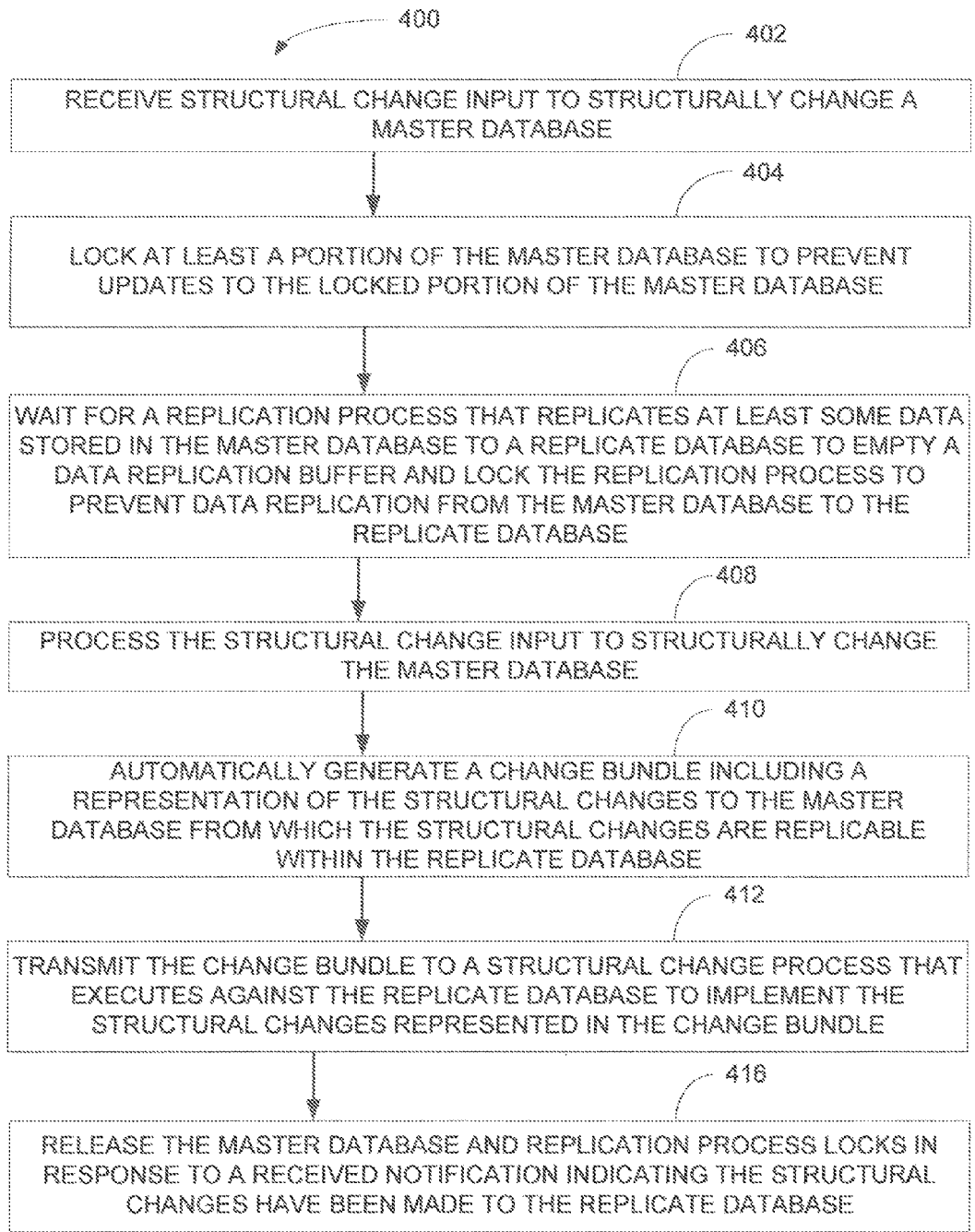
FIG. 4 is a flow diagram of a method, according to an example embodiment.

FIG. 4 is a flow diagram of a method 400, according to an example embodiment. The method 400 is an example of a method to replicate structural changes to a master database in a replicate database. In some embodiments, the method 400 may be performed in whole or in part by an SCAE. The method 400 includes receiving 402 structural change input to structurally change a master database. In some embodiments, receiving 402 the structural change input includes receiving a list of master database tables or other data identifying master database tables subject to structural changes. In such embodiments, the lock of the at least a portion of the master database is performed with regard to the master database tables represented in data of the received 402 structural change input.

The method 400 may then lock 404 at least a portion of the master database to prevent updates to the locked portion of the master database and then waiting 406 for a replication process that replicates at least some data stored in the master database to a replicate database to empty a data replication buffer. The replication process may then be locked to prevent data replication from the master database to the replicate database. However, in some embodiments, locking the replication process is not performed as locking at least a portion or an entirety of the master database to prevent updates thereto will prevent updates to the master database that would then trigger the replication process. The replication process in such embodiments would therefore also essentially, although not explicitly, be locked at least with regard to the locked portions of the master database.

The method 400 may then process 408 the structural change input to structurally change the master database and automatically generate 410 a change bundle including a representation of the structural changes to the master database from which the structural changes are replicable within the replicate database. The change bundle is then transmitted 412 to a structural change process that executes against the replicate database to implement the structural changes represented in the change bundle. Note that in some embodiments, a process that performs the method 400 may be the same structural change process that executes against the replicate database to implement the structural changes. Thus, in such embodiments, the transmitting 412 of the change bundle may simply include passing execution of the process to a portion of the structural change process that implements the structural changes in the replicate database.

However, in other embodiments, the structural change process that executes against the replicate database to implement the structural changes may be a process within a different computing environment and the transmitting 412 may be performed by sending the change bundle over a network.

The method 400 may then release 416 the master database and replication process locks in response to a received notification indicating the structural changes have been made to the replicate database.

In some embodiments, the received 402 structural change input includes instructions executable by a structural change process performing the method 400 to structurally change the master database. Such instructions may include DDL statements, metadata that has data processing context within a process receiving 402 the structural change input, and the like. The processing 408 of the structural change input in such embodiments includes the structural change process executing the instructions included in the received structural change input.

Figure 5:
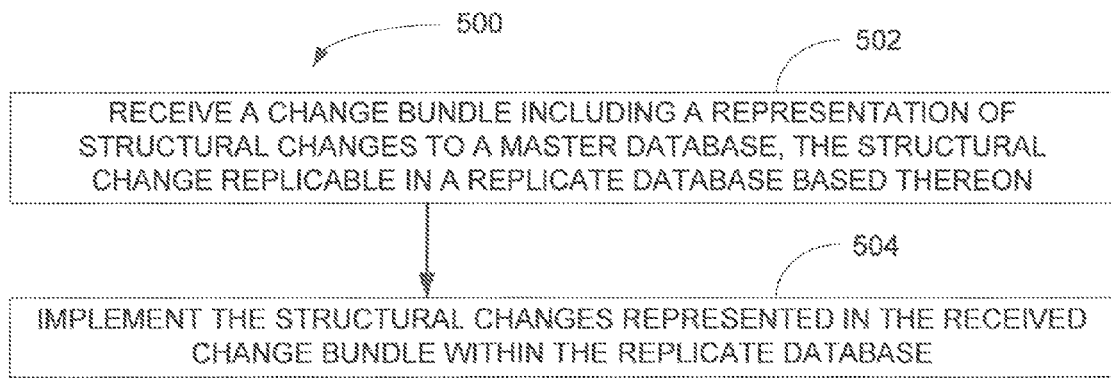
FIG. 5 is a flow diagram of a method, according to an example embodiment.

FIG. 5 is a flow diagram of a method 500, according to an example embodiment. The method 500 is an example of a method performed to replicate structural changes of a master database in a replicate database. In some embodiments, the method 500 may be performed as a part of the method 400 subsequent to the transmitting 412 of the change handle and prior to releasing 416 the master database and replication process locks. In such embodiments, the method 500 may be performed as part of a process or by a data processing component that also performs the method 400. In other embodiments, the method 500 may be implemented in a data processing component that is part of a replicate DBMS or a data-processing component that otherwise executes against the replicate database.

In some embodiments, the method 500 includes receiving 502 a change bundle including a representation of structural changes to a master database. The structural changes represented in the change bundle are replicable in a replicate database based on the change bundle. The method 500 further includes implementing 504 the structural changes represented in the received change bundle within the replicate database. Some embodiments may then transmit a notification indicating the structural changes have been made to the replicate database. Such notification may be transmitted to the master database or a process that issued the lock of the master database such as a process implementing the method 400 of FIG. 4.

In some embodiments, prior to implementing 504 the structural changes within the replicate database, the method 500 includes locking at least a portion of the replicate database identified as being subject to the structural changes represented in the received change bundle. In such embodiments, subsequent to implementing 504 the structural changes within the replicate database, the method 500 includes releasing the replicate database lock.

Figure 6:
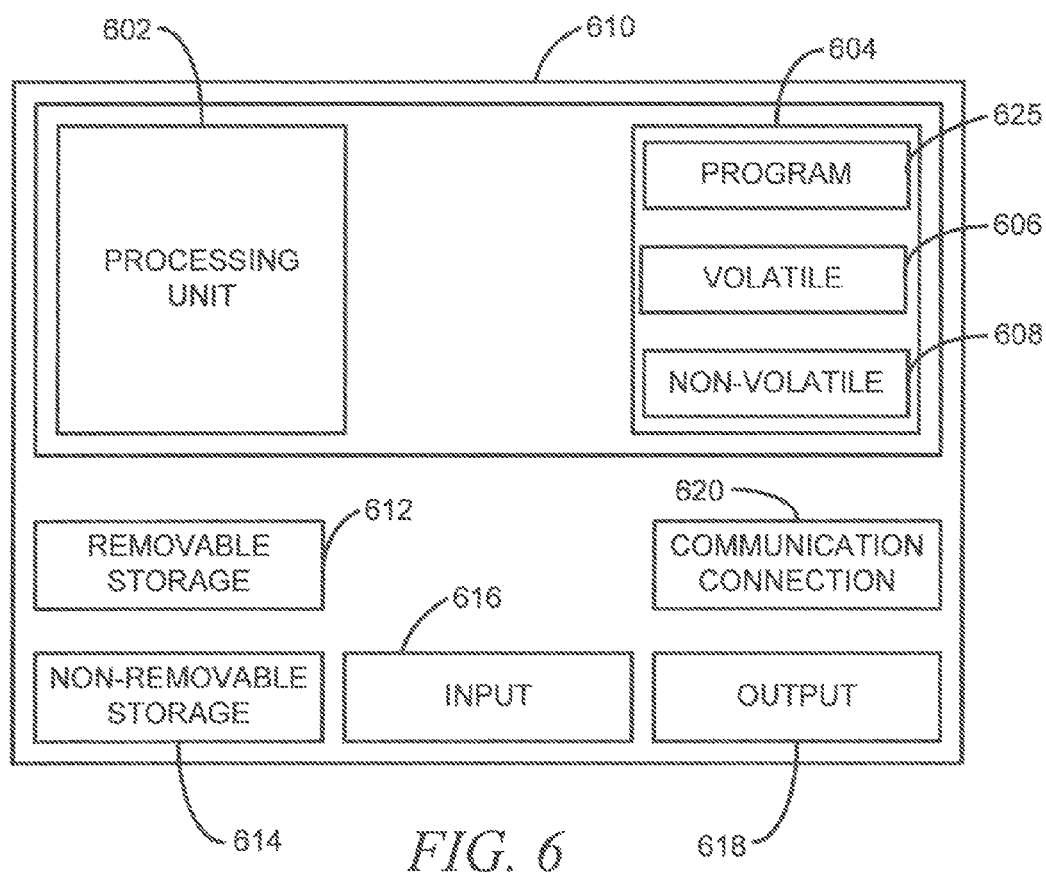
FIG. 6 is a block diagram of a computing device, according to an example embodiment.

FIG. 6 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between, the multiple systems and components. One example computing device in the form of a computer 610, may include a processing unit 602, memory 604, removable storage 612, and non-removable storage 614. Memory 604 may include volatile memory 606 and non-volatile memory 608. Computer 610 may include—or have access to a computing environment that includes—a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a non-transitory computer-readable storage medium are executable by the processing unit 602 of the computer 610. A hard drive, CD-ROM, and RAM are some examples of articles including a non-transitory computer-readable storage medium. For example, a computer program 625 capable of performing one or more of the methods, or portions thereof as illustrated and describe herein may be stored in whole or in part on one or more non-transitory computer-readable storage mediums.

It will be readily understood to those skilled in the art that various other changes in the details, material, and arrangements of the parts and method stages which have been described and illustrated in order to explain the nature of the inventive subject matter may be made without, departing from the principles and scope of the inventive subject matter as expressed in the subjoined claims.

What is claimed is:
1. A method comprising:
receiving structural change input to structurally change a master database;
obtaining a first lock that locks at least a portion of the master database to prevent updates to the locked portion of the master database;
after obtaining the first lock, waiting for a replication process that replicates at least some data stored in the master database to a replicate database to empty a data replication buffer; and
after obtaining the first lock and after waiting for the replication process to empty the data replication buffer, obtaining a second lock that locks the replication process to prevent data replication from the master database to the replicate database;
processing the structural change input to structurally change the master database;
automatically generating a change bundle including a representation of the structural changes to the master database from which the structural changes are replicable within the replicate database;
transmitting the change bundle to a structural change process that executes against the replicate database to implement the structural changes represented in the change bundle; and releasing the first lock and the second lock in response to a received notification indicating the structural changes have been made to the replicate database.

2. The method of claim 1, wherein the structural change process that executes against the replicate database to implement the structural changes represented in the change bundle, upon receipt of the change bundle, includes:
- implementing the structural changes represented in the received change bundle within the replicate database; and
- transmitting the notification indicating the structural changes have been made to the replicate database.

3. The method of claim 2, further comprising:
- prior to implementing the structural changes within the replicate database, obtaining a third lock that locks at least a portion of the replicate database identified as being subject to the structural changes represented in the received change bundle; and
- subsequent to implementing the structural changes within the replicate database, releasing the third lock.

4. The method of claim 3, wherein the first lock is a write lock and the third lock is a read lock.

5. The method of claim 1, wherein the received structural change input includes a list of master database tables subject to structural changes and wherein the first lock locks the master database tables represented in the list of tables.

6. The method of claim 5, wherein:
- the received structural change input includes instructions executable by a structural change process performing the method to structurally change the master database; and
- the processing of the structural change input to structurally change the master database includes the structural change process executing the instructions included in the received structural change input.

7. The method of claim 1, wherein the structural change input includes a change with regard to a property of a column of a first table in the master database.

8. The method of claim 7, wherein the property of the column of the first table in the master database is a foreign key relation to data stored in a second table in the master database descriptive of a value stored in the first table.

9. The method of claim 1, wherein automatically generating the change bundle including the representation of the structural changes to the master database from which the structural changes are replicable within the replicate database includes:
- generating a metadata representation of the structural changes to the master database including any mappings, data transformations; and views present in the replicate database derived from a structure of or data present in the master database.

10. The method of claim 9, wherein generating the metadata representation of the structural changes to the master database is performed as a function of a log of changes made to the master database based on the received structural change input.

11. A system comprising:
- a computing platform including at least one processor, at least one memory device, and at least one network interface device, the at least one memory device storing instructions executable by the at least one processor to perform operations comprising:
  - receiving, via the at least one network interface device, structural change input structurally change a master database;
  - obtaining a first lock that locks at least a portion of the master database to prevent updates to the locked portion of the master database; and
  - after obtaining the first lock, obtaining a second lock that locks a replication process that replicates at least some data stored in the master database to a replicate database upon a buffer of data to be replicated becoming empty;
  - processing the structural change input to structurally change the master database;
  - automatically generating a change bundle including a representation of the structural changes to the master database from which the structural changes are replicable within the replicate database;
  - transmitting, via the at least one network interface device, the change bundle to a structural change process that executes against the replicate database; and
  - releasing the first lock and the second lock in response to a received notification indicating the structural changes have been implemented in the replicate database.

12. The system of claim 11, wherein the structural change process that executes against the replicate database to implement the structural changes represented in the change bundle, upon receipt of the change bundle, includes:
- implementing the structural changes represented in the received change bundle within the replicate database; and
- transmitting the notification indicating the structural changes have been made to the replicate database.

13. The system of claim 12, the at least one memory device further storing instructions executable by the at least one processor to perform operations comprising:
- prior to implementing the structural changes within the replicate database, obtaining a third lock that locks at least a portion of the replicate database identified as being subject to the structural changes represented in the received change bundle; and
- subsequent to implementing the structural changes within the replicate database, releasing the third lock.

14. The system of claim 11, wherein automatically generating the change bundle including the representation of the structural changes to the master database from which the structural changes are replicable within the replicate database includes:
- generating a metadata representation of the structural changes to the master database including any mappings, data transformations, and views present in the replicate database derived from a structure of or data present in the master database affected by the structural changes to the master database.

15. The system of claim 14, wherein generating the metadata representation of the structural changes to the master database is performed as a function of at least one of received structural change input and a log of changes made to the master database.

16. A non-transitory computer readable storage medium with instructions stored thereon which when executed in part by at least one processor of at least one computing device causes the at least one computing device to perform operations comprising:
- receiving structural change input to structurally change a master database;
- Obtaining a first lock that locks at least a portion of the master database to prevent updates to the locked portion of the master database;

after obtaining the first lock, waiting for a replication process that replicates at least some data stored in the master database to a replicate database to empty a data replication buffer; and after obtaining the first lock and after waiting for the replication process to empty the data replication buffer, obtaining a second lock that locks the replication process to prevent data replication from the master database to the replicate database;

processing the structural change input to structurally change the master database;

automatically generating a change bundle including a representation of the structural changes to the master database from which the structural changes are replicable within the replicate database;

transmitting the change bundle to a structural change process that executes against the replicate database to implement the structural changes represented in the change bundle; and releasing the first lock and the second lock in response to a received notification indicating the structural changes have been made to the replicate database.

17. The non-transitory computer readable storage medium of claim 16, wherein:

the non-transitory computer readable storage medium comprises at least two nontransitory computer readable storage mediums, a first non-transitory computer readable storage medium storing instructions executable to effect claim 16 and a second non-transitory computer readable storage medium storing instructions of the structural change process, the instructions of the second non-transitory computer readable storage medium executable to perform operations comprising:

receiving the change bundle;

implementing the structural changes represented in the received change bundle within the replicate database; and transmitting the notification indicating the structural changes have been made to the replicate database.

18. The non-transitory computer readable storage medium of claim 17, the instructions of the second non-transitory computer readable storage medium further executable to perform operations comprising:

prior to implementing the structural changes within the replicate database, obtaining a third lock that locks at least a portion of the replicate database identified as being subject to the structural changes represented in the received change bundle; and subsequent to implementing the structural changes within the replicate database, releasing the third lock.

19. The non-transitory computer readable storage medium of claim 16, wherein the structural change input includes a change with regard to a property of a column of a first table in the master database.

20. The non-transitory computer readable storage medium of claim 16, wherein automatically generating the change bundle including the representation of the structural changes to the master database from which the structural changes are replicable within replicate database includes:

generating a metadata representation of the structural changes to the master database including any mappings, data transformations, and views present in replicate database derived from a structure of or data present in the master database.

* * * * *